US009701187B2

United States Patent
Smetana et al.

(10) Patent No.: US 9,701,187 B2
(45) Date of Patent: Jul. 11, 2017

(54) DRIVE DEVICE FOR A VEHICLE AND VEHICLE COMPRISING THE DRIVE DEVICE

(71) Applicant: Schaeffler Technologies AG & Co. KG, Herzogenaurach (DE)

(72) Inventors: Tomas Smetana, Herzogenaurach (DE); Philip Wurzberger, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 56 days.

(21) Appl. No.: 14/767,213

(22) PCT Filed: Jan. 20, 2014

(86) PCT No.: PCT/DE2014/200012
§ 371 (c)(1),
(2) Date: Aug. 11, 2015

(87) PCT Pub. No.: WO2014/124639
PCT Pub. Date: Aug. 21, 2014

(65) Prior Publication Data
US 2015/0375611 A1    Dec. 31, 2015

(30) Foreign Application Priority Data
Feb. 14, 2013    (DE) .......... 10 2013 202 382

(51) Int. Cl.
*B60K 6/48*    (2007.10)
*B60K 6/365*    (2007.10)
(Continued)

(52) U.S. Cl.
CPC .......... *B60K 6/365* (2013.01); *B60K 6/48* (2013.01); *F16H 48/36* (2013.01); *B60K 17/165* (2013.01);
(Continued)

(58) Field of Classification Search
CPC ........ B60K 6/365; B60K 6/48; B60K 17/165; B60K 2023/043; F16H 48/24;
(Continued)

(56) References Cited

U.S. PATENT DOCUMENTS 5,437,583 A * 8/1995 Shibahata .............. B60K 23/04
475/151
8,651,991 B1 * 2/2014 Sten ....................... F16H 48/30
475/150
(Continued)

FOREIGN PATENT DOCUMENTS

DE  10 2006 031 089 A1   1/2008
DE  10 2009 056366        6/2011
(Continued)

*Primary Examiner* — Roger Pang
(74) *Attorney, Agent, or Firm* — Davidson, Davidson & Kappel, LLC

(57) ABSTRACT

A drive device which can use a hybrid drive as well as a torque distribution using the same electric motor and which can also have a simple structure. The drive device (1) can be coupled or is coupled to a first and a second motor (6, 7), the second motor (7) can be used in accordance with the shift state of a shifting device (13) for a drive or for an active torque distribution.

8 Claims, 4 Drawing Sheets

(51) Int. Cl.
*F16H 48/36* (2012.01)
*F16H 48/24* (2006.01)
*B60K 17/16* (2006.01)
*B60K 1/00* (2006.01)
*B60K 23/04* (2006.01)

(52) U.S. Cl.
CPC ............... *B60K 2001/001* (2013.01); *B60K 2006/4833* (2013.01); *B60K 2023/043* (2013.01); *B60Y 2400/804* (2013.01); *F16H 48/24* (2013.01); *F16H 2048/364* (2013.01); *F16H 2048/368* (2013.01); *Y02T 10/6221* (2013.01); *Y10S 903/911* (2013.01)

(58) Field of Classification Search
CPC ............... F16H 48/36; F16H 2048/364; F16H 2048/368; Y10S 903/911; B60Y 2400/804
USPC .................... 475/5, 150, 203, 204, 205
See application file for complete search history.

(56) References Cited

U.S. PATENT DOCUMENTS

| | | | |
|---|---|---|---|
| 2007/0087885 A1* | 4/2007 | Rosemeier | B60K 17/346 475/5 |
| 2012/0058855 A1 | 3/2012 | Stein | |
| 2015/0336453 A1* | 11/2015 | Pinschmidt | B60K 6/365 475/5 |

FOREIGN PATENT DOCUMENTS

| | | | |
|---|---|---|---|
| DE | 10 2010 036240 | 3/2012 | |
| EP | 1 232 891 | 8/2002 | |
| EP | 2474434 | 7/2012 | |
| JP | EP 1787846 A1 * | 5/2007 | ............. B60K 6/365 |
| SE | WO 2015169837 A1 * | 11/2015 | ............... B60K 6/48 |

* cited by examiner

DRIVE DEVICE FOR A VEHICLE AND VEHICLE COMPRISING THE DRIVE DEVICE The present invention relates to a drive device for a vehicle. The present invention also relates to a vehicle including this drive device.

Hybrid drives are used to be able to power vehicles optionally by an internal combustion engine, an electric engine or simultaneously by an electric motor and an internal combustion engine. In this way, an optimal choice of the source for the drive torque may take place for the vehicle for every operating situation. Another technical field for which an internal combustion engine as well as simultaneously an electric motor is used in a vehicle is active torque distribution, i.e., an active, asymmetric distribution of the drive torque to the wheels of a driven axle, in order to be able to compensate for yaw moments when negotiating turns, for example.

The publication DE 10 2006 031 089 A1, which is arguably the most proximate prior art, provides a drive device for a vehicle including an internal combustion engine and an electric motor as well as a complex transmission design. As far as functionality is concerned, the drive device according to FIG. 2 allows for optionally shifting to hybrid drive, a joint power flow to a differential of the drive device being guided from the internal combustion engine and the electric motor. Alternatively thereto, the drive device may implement a power and torque distribution to the wheels, the drive torque being guided from the internal combustion engine via the differential to the wheels and the drive torque of the electric motor being distributed asymmetrically in order to achieve the torque distribution.

SUMMARY OF THE INVENTION

It is an object of the present invention to provide a drive device which is able to implement a hybrid drive as well as a torque distribution with the same electric motor and which has a simple design.

The present invention provides a drive device which is suitable and/or designed for a vehicle. The vehicle is, in particular, implemented as a passenger car, a truck, a bus or the like.

The drive device includes a first and a second output shaft which particularly preferably form a joint driven axle of the vehicle. The axle may be a front axle or a rear axle of the vehicle. The output shafts are coupled to the wheels of the vehicle, in particular to the axle. In particular, the first and the second output shafts are rotatably fixedly connected to the wheels. Alternatively thereto, a further gear is situated between the output shafts and the wheels. The output shafts are used to transfer the drive torque from the drive device via the output shafts to the wheels.

The drive device includes a first interface which is designed for coupling a first engine. The first engine may, for example, be coupled to the first interface via a shaft, in particular via a pinion shaft. The engine is preferably implemented as an internal combustion engine. In particular, the first engine provides a main drive torque for the vehicle, in particular for speeds higher than 80 kilometers per hour.

The drive device furthermore includes a differential device, in particular a transverse differential device, which is designed to at least distribute the drive torque from the first interface and/or from the first engine to the two output shafts. In particular, the drive torque is distributed 50:50 without further influence. The differential device includes an input and two outputs. The input of the differential device is coupled, in particular rotatably fixedly connected, to the first interface. For example, the first interface may be designed as a ring gear, the first engine being coupled via the pinion shaft. The two outputs of the differential device are coupled, in particular rotatably fixedly connected, to the first and the second output shafts. In the most general specific embodiment of the present invention, the differential device may be designed as a bevel gear wheel differential device, for example. Preferred specific embodiments of the present invention will be explained in the following.

Furthermore, the drive device includes a second interface which is designed to transfer the drive torque of a second engine. The second engine is, in particular, designed as an electric motor. Particularly preferably, the electric motor is a low-voltage engine having an operating voltage which is lower than 60 volts, preferably lower than 55 volts, and in particular having 48 volts. An operating voltage of this type is used as standard nowadays in many electrical systems of vehicles. The second interface may be directly coupled to the second engine, but a gear, in particular a transmission, is preferably situated between the second interface and the second engine.

The drive device includes an intermediate gear, the intermediate gear being situated in the drive torque flow of the second engine in at least one operating state of the drive device between the second interface and the differential device.

The intermediate gear includes a first and a second output. The first output is rotatably fixedly coupled to the input of the differential device; the second output is rotatably fixedly coupled to one of the output shafts.

A shifting device is provided which is able to shift the drive device into at least two different shifting states: In a first shifting state of the shifting device, the drive torque is guided from the second interface and/or from the second engine to the differential device. In this shifting state, the vehicle may be powered exclusively by the second engine or together with the first engine as a hybrid drive.

In the second shifting state, the drive torque from the second interface and/or from the second engine is used for torque distribution—also referred to as torque vectoring.

It is provided within the scope of the present invention that the intermediate gear includes two inputs, the shifting device being designed to guide the drive torque from the second interface and/or from the second engine to the intermediate gear via the first input in a first shifting state and via the second input into the intermediate gear. The shifting device is, in particular, designed to rotatably fixedly couple, in particular to rotatably fixedly connect, the second interface to the first input in a first shifting state and to rotatably fixedly couple, in particular to rotatably fixedly connect, the second interface to the second input in the second shifting state.

The advantage of the present invention is to be seen in that by switching over the drive torque flow from the first to the second input a structurally simple approach may be achieved with less effort compared to the prior art. Due to the reduced construction effort, a considerable weight, installation space and/or cost reduction may be achieved.

In one preferred constructive embodiment, the intermediate gear includes a drive planetary gear set and a distribution planetary gear set, it being particularly preferred that both planetary gear sets are designed as spur planetary gear sets, each including at least one planet set. Spur planetary gear sets are understood to mean planetary gear sets which use spur gear wheels having a circumferential toothing which is situated on the front side. In the preferred constructive embodiment, it is provided that the drive planetary gear set and the distribution planetary gear set each have a sun gear, the sun gears of the two planetary gear sets being rotatably fixedly coupled to one another. In particular, the sun gears of the two planetary gear sets are designed as a double sun gear. This design results in a coupling of the two planetary gear sets which is very reliable and requires only a small axial installation space.

In one possible constructive embodiment, the drive planetary gear set includes an annulus gear, which is fastened to the housing or is stationary, a planetary carrier, and a set of planet wheels. The planet wheels are rotatably mounted on the planetary carrier on a joint pitch circle and mesh with the sun gear as well as with the annulus gear of the drive planetary gear set. The planetary carrier forms the first output of the intermediate gear and is rotatably fixedly coupled, in particular connected to the input of the differential device, as already mentioned above. Furthermore, the drive planetary gear set includes a first input gear, the input gear being rotatably fixedly coupled, in particular connected, to the sun gears, in particular to the double sun gear.

It is furthermore preferred that the distribution planetary gear set includes an annulus gear, a planetary carrier, and a set of planet wheels which are rotatably mounted on the planetary carrier on a pitch circle. The planet wheels mesh with the sun gear and with the annulus gear of the distribution planetary gear set. The planetary carrier of the distribution planetary gear set forms the second output and is thus rotatably fixedly coupled, in particular connected, to one of the output shafts. Furthermore, the distribution planetary gear set includes a second input gear, the second input gear being rotatably fixedly coupled, in particular connected, to the annulus gear of the distribution planetary gear set. The input gear may also be designed in one piece with the annulus gear.

In particular by using two planetary gear sets, each including a planet set, it is possible to construct the drive device in an installation-space saving manner. The output shafts of the drive device particularly preferably define a main axis of rotation, the sun gears, the planetary carriers and/or the annulus gears of the two planetary gear sets being situated coaxially to the main axis of rotation.

The first input gear and the second input gear are, in particular, situated coaxially to one another. With the goal of being able to design the shifting device to be as simple as possible, it is preferred that the first and the second input gears have the same diameter, in particular the same outer diameter. The first and the second input gears are particularly preferably situated adjacently, in particular directly adjacently, to one another.

In one preferred embodiment of the present invention, the second interface includes an interface annulus gear and the shifting device includes a shiftable coupling member. In particular, the shiftable coupling member is situated displaceably in the axial direction to the main axis of rotation. The shiftable coupling member is designed in such a way that the interface annulus gear is optionally coupleable to the first or to the second input gear. In particular, the coupling takes place exclusively so that the interface annulus gear and thus the second interface are thus coupleable either to the first or to the second input gear. A simultaneous coupling is not possible. The advantage of the embodiment is to be seen in that the shifting device in combination with the second interface and the input gears is to be implemented very compactly and thus in an installation-space saving manner.

It is preferably provided that the shifting device is designed to shift the intermediate gear into an intermediate shifting state between the first and the second shifting states. In this intermediate shifting state, the second interface is decoupled from the intermediate gear. This intermediate shifting state is used to adapt the rotational speed of the second interface and thus of the second engine to the various tasks. While in the first shifting state the second interface and/or the electric motor must have a rotational speed which is adapted to the instantaneous rotational speed of the output shafts and thus of the wheels, in the second shifting state, an active torque distribution is not necessary at least when the vehicle is driving straight ahead so that the rotational speed of the second interface and thus of the second engine equals zero. The intermediate shifting state may thus be used to decelerate or accelerate the second interface or the second engine as a function of the shifting direction.

The first engine is particularly preferably designed as an internal combustion engine and the second engine as an electric motor. In particular, the first and/or the second engine form(s) a part of the drive device.

In one preferred refinement of the present invention, a transmission, which is, in particular, designed in such a way that the output rotational speed is smaller than the input rotational speed for the purpose of transforming the usually very high rotational speeds of electric motors, is situated between the second interface and the second engine.

Another object of the present invention is a vehicle including the drive device described previously. The drive device is, in particular, designed to drive a driven axle of the vehicle.

Particularly preferably, the drive device and/or the vehicle is/are designed in such a way that in the first shifting state, the drive device makes possible an exclusive starting aid system for the low-speed range between 0 through 50 km/h, for example, for maneuvering, parking, start-stop driving, or for driving in purely electric mode. Alternatively, the first shifting state is used to achieve a hybrid drive or a boost drive, the drive torque of the first and the second engines being distributed for the drive via the differential device. It is provided, in particular, that starting from speeds greater than 30 km/h, preferably greater than 40 km/h, it is shifted to the second shifting state in order to use—independently of the speed—the active torque distribution up to the maximum speed of the vehicle.

Another particular feature of the drive device is that the second engine, in particular the electric motor, is used for driving as well as for active torque distribution and thus represents a two-in-one approach.

BRIEF DESCRIPTION OF THE DRAWINGS

Other features, advantages, and effects of the present invention are derived from the following description of one preferred exemplary embodiment of the present invention.

DETAILED DESCRIPTION

Figure 1:
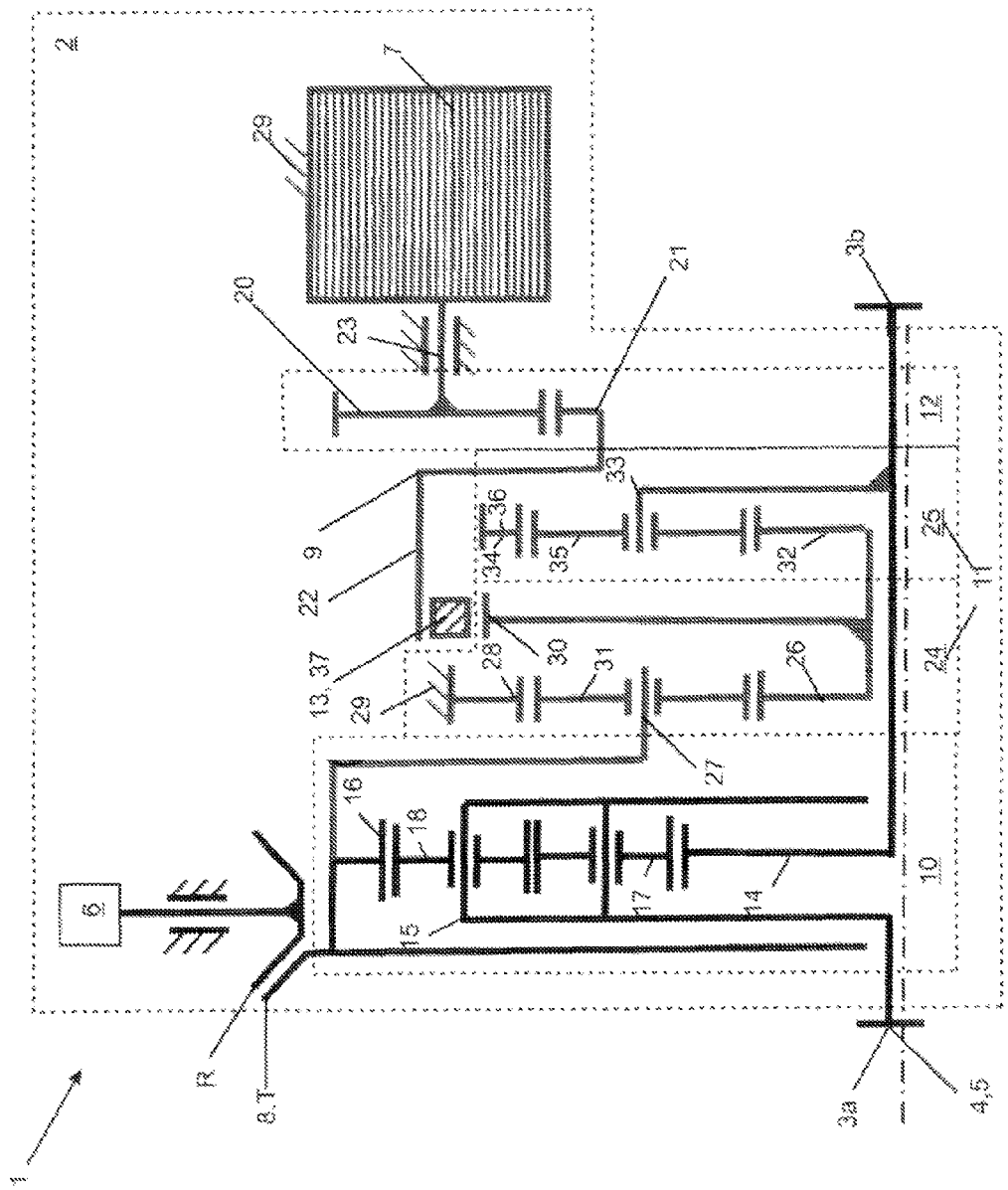
FIG. 1 shows a schematic representation of a drive device for a vehicle as one exemplary embodiment of the present invention.

FIG. 1 illustrates in a schematic representation a drive device 1 for a vehicle 2 as one exemplary embodiment of the present invention. Drive device 1 includes two output shafts 3a, b which are drivably coupled to the wheels of vehicle 2 (not shown). It is possible in this case that output shafts 3 a, b are rotatably fixedly connected to the wheels or via a further gear. Output shafts 3a, b define a joint output axle 4. In addition, the output shafts define a main axis of rotation 5.

Vehicle 2 includes a first engine 6, which is designed as an internal combustion engine, as well as a second engine 7, which is designed as an electric motor, for the purpose of generating a drive torque for output shafts 3a, b. First engine 6 is connected to drive device 1 via a first interface 8, the drive torque of first engine 6 being guided via the first interface into drive device 1. The drive torque in drive device 1 is transferred via a second interface 9. Second interface 9 is situated in drive device 1.

From a schematic point of view, drive device 1 includes a differential planetary gear set 10 as a differential device, an intermediate gear 11, a transmission gear set 12 as a transmission as well as a shifting device 13 which is able to couple second interface 9 and intermediate gear 11 to one another in different shifting states (I, NTV, TV).

Differential Planetary Gear Set 10:

Differential planetary gear set 10 includes a sun gear 14, a planetary carrier 15, an annulus gear 16 as well as two sets of planet wheels 17, 18. The two sets of planet wheels 17, 18 are rotatably situated on planetary carrier 15. The two sets of planet wheels 17, 18 mesh in pairs with one another so that a planet wheel of set 17 meshes with a planet wheel of set 18 in each case. In addition, the planet wheel of set 17 meshes with sun gear 14 and the planet wheel of set 18 meshes with annulus gear 16.

Planetary carrier 15 forms a first output of differential planetary gear set 10 and is rotatably fixedly connected to output shaft 3a. Sun gear 14 forms a second output of differential planetary gear set 10 and is rotatably fixedly connected to output shaft 3b. Annulus gear 16 includes a ring gear T which meshes with a pinion shaft R, ring gear T forming first interface 8. Sun gear 14, planetary carrier 15, and annulus gear 16 are situated coaxially to main axis of rotation 5.

Differential planetary gear set 10 has the function of evenly distributing the drive torque of first engine 6 to output shafts 3a, b.

Transmission 12:

Transmission 12 is designed as a one-stage spur gear 19. The input of transmission 12 is rotatably fixedly coupled to a rotor shaft 23 of the second engine. An input spur gear wheel 20 which meshes with an output spur gear wheel 21 is situated on rotor shaft 23 or on the input. Output spur gear wheel 21 is situated coaxially to main axis of rotation 5. Output spur gear wheel 21 is rotatably fixedly connected to second interface 9 as the output. Second interface 9 includes an interface annulus gear 22 which meshes with output spur gear wheel 21 so that output spur gear wheel 21 and the interface annulus gear rotate around main axis of rotation 5 at the same rotational speed.

Intermediate Gear 11:

Intermediate gear 11 includes a drive planetary gear set 24 as the drive gear section and a distribution planetary gear set 25 as the distribution gear section. Drive planetary gear set 24 includes a sun gear 26, a planetary carrier 27, and an annulus gear 28, annulus gear 28 being situated in a surrounding structure 29.

Sun gear 26 is rotatably fixedly coupled to a first input gear 30. A set of planet wheels 31 meshes with sun gear 26 and annulus gear 28. Sun gear 26 forms the input to drive planetary gear set 24. Planetary carrier 27 forms the first output of drive planetary gear set 24 or of intermediate gear 11 and is rotatably fixedly connected to annulus gear 16 of differential planetary gear set 10.

Distribution planetary gear set 25 includes a sun gear 32, a planetary carrier 33, an annulus gear 34 as well as a set of planet gears 35, set of planet gears 35 meshing with sun gear 32 and annulus gear 34. Annulus gear 34 simultaneously forms a second input gear 36. Planetary carrier 33 is rotatably fixedly coupled to output shaft 3b. Sun gear 32 is rotatably fixedly coupled to first input gear 30 and at the same time to sun gear 26 of drive planetary gear set 24 so that sun gears 32 and 26 form a double sun gear. First input gear 30, second input gear 36 as well as planetary carriers 27, 33 are situated coaxially to main axis of rotation 5.

Shifting Device 13:

Shifting device 13 is used to set the different shifting states so that intermediate gear 11 and second interface 9 may assume different operating states. For this purpose, interface hollow shaft 22 is differently rotatably fixedly connected to input gears 30, 36. Input gears 30, 36 are situated directly adjacently and each have the same outer diameter.

Shifting device 13 includes a coupling member 37 which is situated displaceably in the axial direction and which forms a coupling area. Coupling member 37 is designed to engage in a rotatably fixed coupling with input gears 30, 36 in the case of an overlap in the axial direction. The activation of coupling member 37 may be carried out electromechanically, electrohydrostatically, hydraulically, or electromagnetically.

Figure 2:
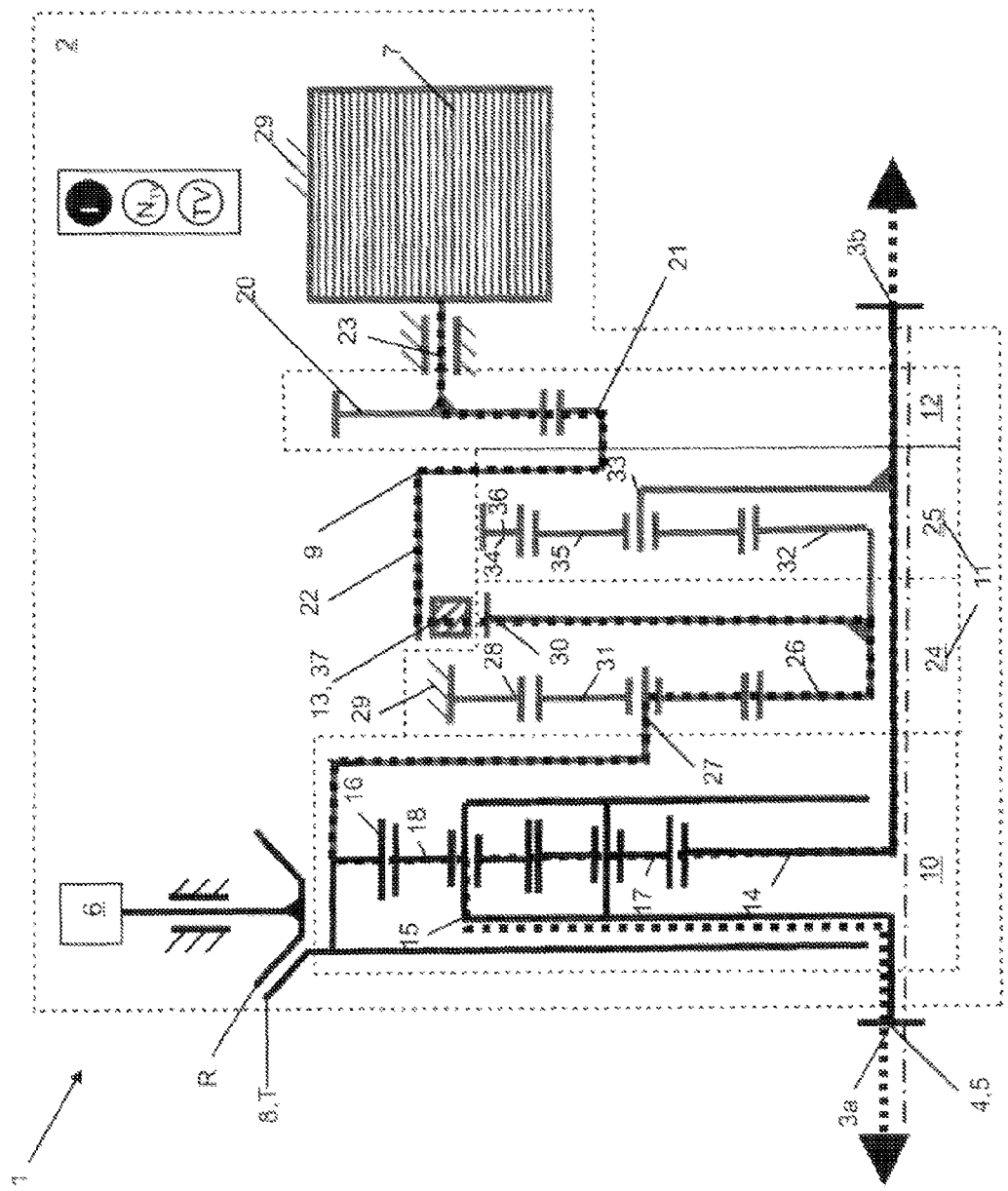
FIG. 2 shows the drive device from FIG. 1 including the plotted torque flow in the first shifting state.

The different shifting states (I, NTV, TV) of shifting device 13 are described in conjunction with the following figures:

FIG. 2 shows first shifting state I, interface annulus gear 22 being rotatably fixedly coupled to first input gear 30 via coupling member 37. In this shifting state I, the drive torque for output shafts 3a, b may be optionally generated exclusively via second engine 7 or as a hybrid drive jointly via first engine 6 and second engine 7. The torque flow from second engine 7 is illustrated in FIG. 2 as a dashed line and runs from rotor shaft 23 via transmission 12, second interface 9, first input gear 30, and drive planetary gear set 24 to differential planetary gear set 10. The drive torque flow of first engine 6 is not illustrated, but runs from first interface 8 via differential planetary gear set 10 to output shafts 3a, b.

Figure 3:
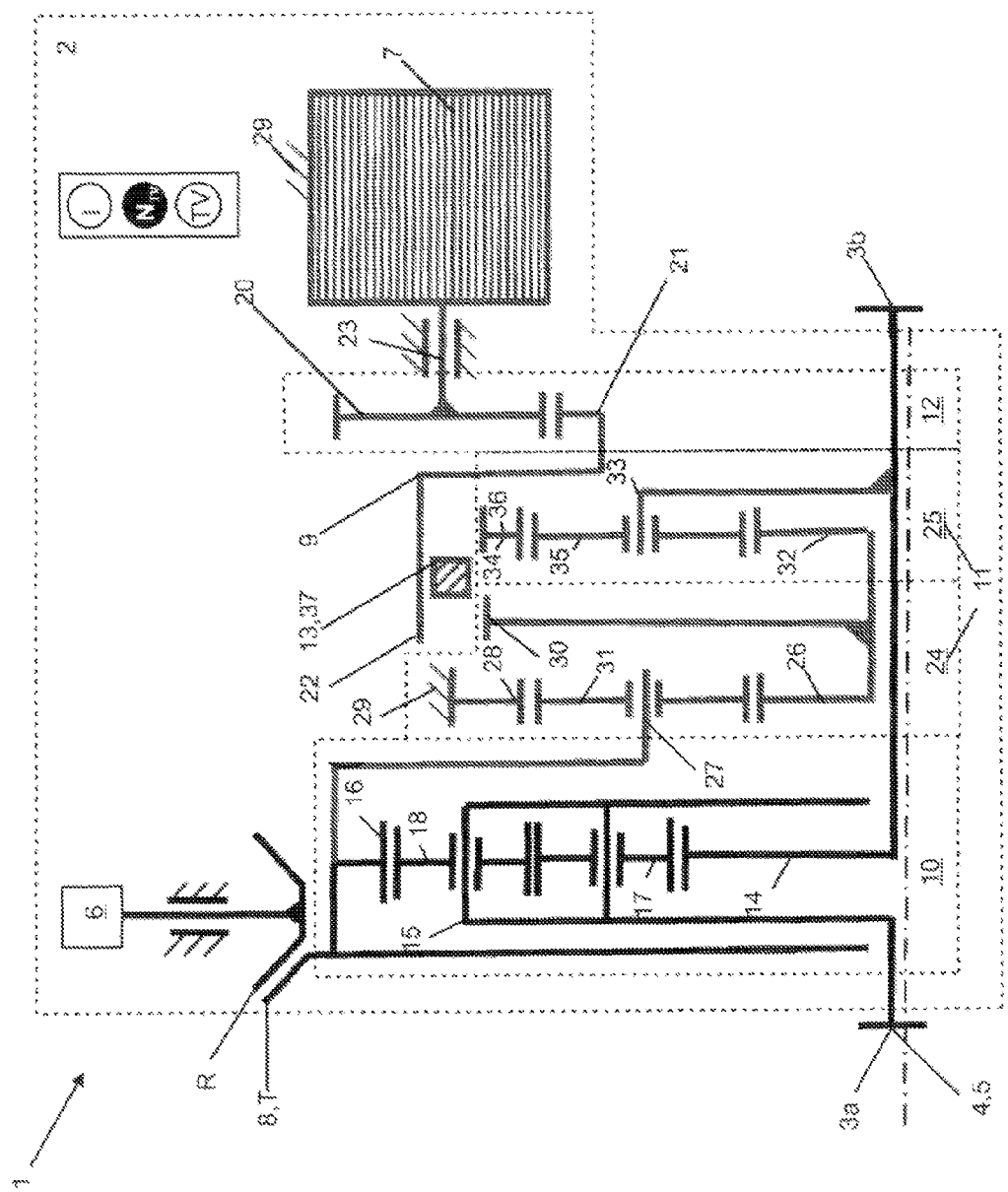
FIG. 3 shows the drive device from FIGS. 1 and 2 in the intermediate shifting state.
Figure 4:
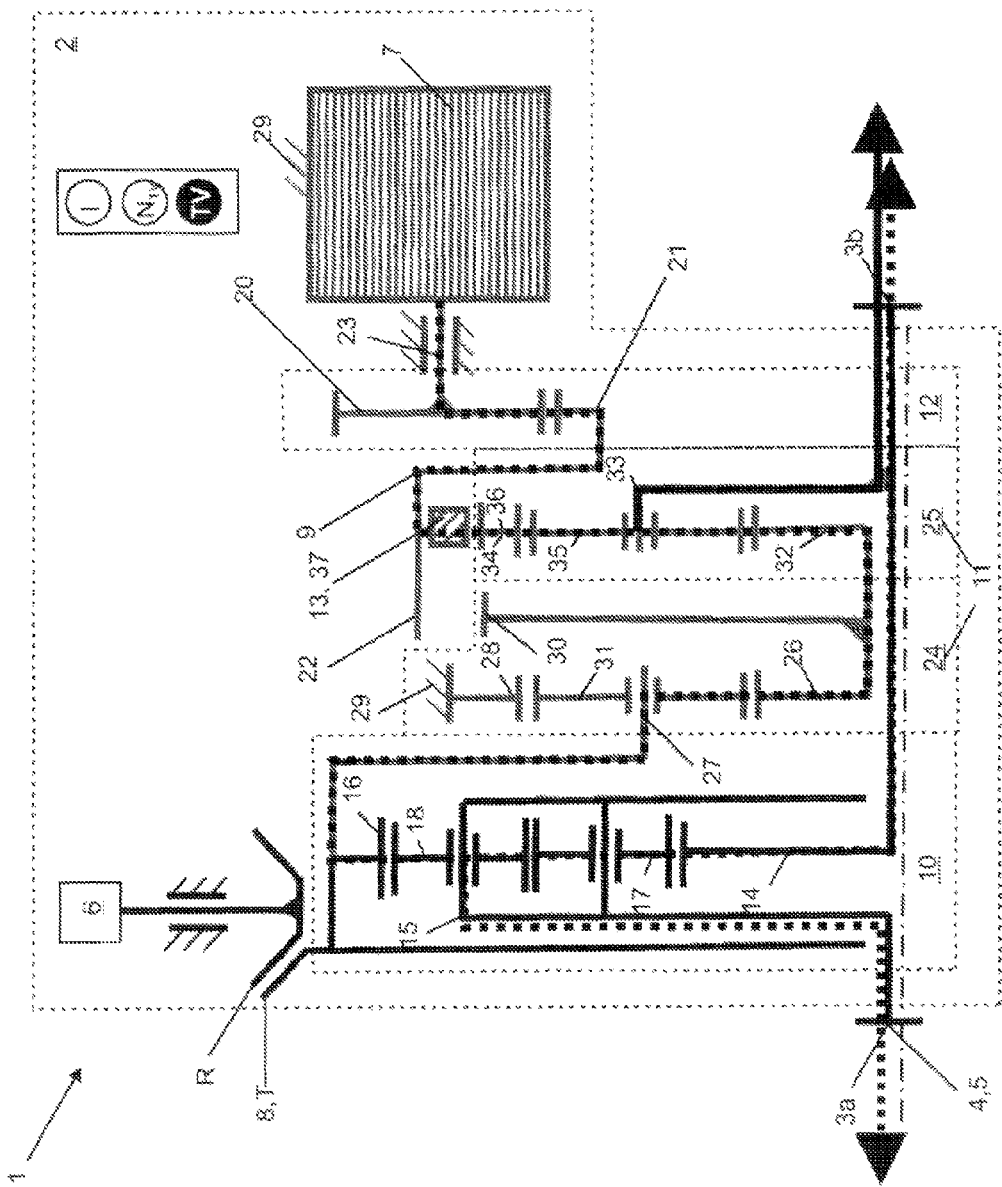
FIG. 4 shows the drive device from the preceding figures in the second shifting state including the plotted torque flow.

As illustrated in FIG. 3, an intermediate shifting state NTV (neutral) is achieved by axially offsetting coupling member 37, coupling member 37 being situated between first input gear 30 and second input gear 36 so that these two are freewheeling. In this intermediate shifting state NTV, second engine 7 is in a neutral position so that it may set—decoupled from output shafts 3a, b—its rotational speed in any arbitrary way. As far as the shifting sequence is concerned, it is shifted from an electrical transmission or a hybrid transmission to a transmission having an active torque distribution TV. The active torque distribution is also referred to as torque vectoring. During the transition from the function of the electrical transmission/hybrid transmission to the function of the torque distribution, second interface 9 and thus second engine 7 must be decelerated. In order to achieve this, intermediate shifting state NTV is used.

By further offsetting coupling member 37 in the axial direction, second shifting state TV is set, coupling member 37 being brought into an axial overlap with second input gear 36 so that now, interface annulus gear 22 and second input gear 36 are rotatably fixedly connected to one another. As is apparent from the illustrated torque flow, it is now possible to bring about an active torque distribution (torque vectoring) through the activation of second engine 7 by actively rotating second input gear 36 clockwise or counterclockwise.

It must be stressed that first shifting state I, intermediate shifting state NTV, and second shifting state TV may be assumed through a serial displacement of coupling member 37 in a single axial direction. In order to achieve this, it is particularly advantageous that first input gear 30 and second input gear 36 have the same outer diameter.

LIST OF REFERENCE NUMERALS 1 drive device
2 vehicle
3a, b output shafts
4 output axle
5 main axis of rotation
6 first engine
7 second engine
8 first interface
9 second interface
10 differential planetary gear set
11 intermediate gear
12 transmission planetary gear set
13 shifting device
14 sun gear
15 planetary carrier
16 annulus gear
17 planet wheels
18 planet wheels
T ring gear
R pinion shaft
19 spur gear
20 input spur gear wheel
21 output spur gear wheel
22 interface annulus gear
23 rotor shaft
24 drive planetary gear set
25 distribution planetary gear set
26 sun gear
27 planetary carrier
28 annulus gear
29 surrounding structure
30 first input gear
31 planet wheels
32 sun gear
33 planetary carrier
34 annulus gear
35 planet gears
36 second input gear
37 coupling member

What is claimed is:

1. A drive device for a vehicle, comprising:
a first and a second output shaft;
a first interface for coupling a first engine;
a differential device for distributing the drive torque from the first interface to the first and second output shaft, the differential device including an input and two outputs and the input of the differential device being coupled to the first interface and the two outputs of the differential device being coupled to the first and the second output shafts;
a second interface for transferring the drive torque of a second engine; and
an intermediate gear, the intermediate gear being situated between the second interface and the differential device;
the intermediate gear including a first and a second output, the first output being rotatably fixedly coupled to the input of the differential device and the second output being rotatably fixedly coupled to one of the first and second output shafts;
a shifter, the shifter being designed to shift the intermediate gear into at least two different shifting states;
in a first shifting state of the shifter, the drive torque being guided from the second interface or from the second engine to the differential device; and
in a second shifting state, the drive torque from the second interface or from the second engine being used for torque distribution; and
the intermediate gear including two inputs, the shifter being designed to guide the drive torque from the second interface or from the second engine into the intermediate gear via a first input of the two inputs in the first shifting state and via a second input of the two inputs in the second shifting state,
wherein the intermediate gear includes a drive planetary gear set and a distribution planetary gear set, sun gears of the drive planetary gear set and of the distribution planetary gear set being coupled to one another and,
wherein the drive planetary gear set includes an annulus gear fastened to the housing or stationary, a planetary carrier, and a set of planet wheels rotatably mounted on the planetary carrier and meshing with the sun gear of the drive planetary gear set and with the annulus gear of the drive planetary gear set, the planetary carrier forming the first output, and a first input gear, the first input gear being rotatably fixedly coupled to the sun gears.

2. The drive device as recited in claim 1 wherein the distribution planetary gear set includes an annulus gear, a planetary carrier, and a set of planet wheels rotatably fixedly mounted on the planetary carrier meshing with the sun gear of the distribution planetary gear set and with the annulus gear of the distribution planetary gear set, the planetary carrier forming the second output, and a second input gear, the second input gear being rotatably fixedly coupled to the annulus gear of the distribution planetary gear set.

3. The drive device as recited in claim 2 wherein a first input gear and the second input gear are situated coaxially to one another.

4. The drive device as recited in claim 3 wherein the first and the second input gears have the same diameter.

5. The drive device as recited in claim 1 wherein the second interface includes an interface annulus gear, the shifter including a shiftable coupling member so that the interface annulus gear is coupleable to the first or to the second input gear.

6. The drive device as recited in claim 1 wherein the shifter is designed to shift the intermediate gear into an intermediate shifting state between the first and the second shifting states where the second interface is decoupled from the intermediate gear.

7. The drive device as recited in claim 1 further comprising a transmission situated between the second interface and the second engine.

8. A vehicle comprising the drive device as recited in claim 1.

* * * * *